(12) United States Patent
Sharma et al.

(10) Patent No.: US 11,361,548 B2
(45) Date of Patent: Jun. 14, 2022

(54) METHOD AND SYSTEM FOR MULTI INSTANCE VISUAL TRACKING BASED ON OBSERVER MOTION MODELLING

(71) Applicant: Tata Consultancy Services Limited, Mumbai (IN)

(72) Inventors: Hrishikesh Sharma, Bangalore (IN); Balamuralidhar Purushothaman, Bangalore (IN); Veera Hari Krishna Nukala, Tirupati (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 107 days.

(21) Appl. No.: 17/077,900

(22) Filed: Oct. 22, 2020

(65) Prior Publication Data

US 2021/0124933 A1 Apr. 29, 2021

(30) Foreign Application Priority Data

Oct. 23, 2019 (IN) .............................. 201921043155

(51) Int. Cl.
*G06V 20/40* (2022.01)
*G06T 7/246* (2017.01)
*G06T 7/285* (2017.01)
*G06T 7/00* (2017.01)
*G06V 10/20* (2022.01)

(52) U.S. Cl.
CPC .............. *G06V 20/46* (2022.01); *G06T 7/251* (2017.01); *G06T 7/285* (2017.01); *G06T 7/97* (2017.01); *G06V 10/255* (2022.01)

(58) Field of Classification Search
CPC ............ G06T 7/246; G06T 7/285; G06T 7/20
See application file for complete search history.

(56) References Cited

U.S. PATENT DOCUMENTS

2008/0273751 A1* 11/2008 Yuan ....................... G06T 7/579
382/103
2017/0140231 A1* 5/2017 Chen ....................... G06T 7/292

OTHER PUBLICATIONS

Hu, Wu-Chih, et al. "Moving object detection and tracking from video captured by moving camera." Journal of Visual Communication and Image Representation 30 (2015): 164-180. (Year: 2015).*

(Continued)

*Primary Examiner* — Vincent Rudolph
*Assistant Examiner* — Raphael Schwartz
(74) *Attorney, Agent, or Firm* — Finnegan, Henderson, Farabow, Garrett & Dunner, LLP

(57) ABSTRACT

This disclosure relates generally to multi instance visual tracking based on observer motion modelling. Conventional state-of-the-art methods have major challenges in dealing with the error rate, accuracy of tracking the moving objects when observer motion is also considered. Embodiments of the present disclosure provide a method for multi instance visual tracking considering the motion of observer. The method tracks moving objects in an input video comprising a set of image frames, by detecting the moving objects in each image frame. The method detects the moving objects in each image frame by calculating trifocal tensors and fundamental matrix of the previous frames. The disclosed multi instance visual tracking can be used in remote surveillance problem for tracking moving objects.

9 Claims, 8 Drawing Sheets

(56) References Cited

OTHER PUBLICATIONS

Kundu, Abhijit, K. Madhava Krishna, and Jayanthi Sivaswamy. "Moving object detection by multi-view geometric techniques from a single camera mounted robot." 2009 IEEE/RSJ International Conference on Intelligent Robots and Systems. IEEE, 2009. (Year: 2009).*

Fremont, Vincent et al., "Mono-Vision based Moving Object Detection in Complex Traffic Scenes", Intelligent Vehicles Symposium (IV), 2017, IEEE, https://www.researchgate.net/publication/318810750_Mono-vision_based_moving_object_detection_in_complex_traffic_scenes/link/5cdd11d0458515712eadf67c/download.

Jung, Sukwoo et al., "Moving Object Detection from Moving Camera Image Sequences Using an Inertial Measurement Unit Sensor", Applied Science, 2019, MDPI, https://www.mdpi.com/2076-3417/10/1/268/pdf.

Kang, Jinman et al., "Detection and Tracking of Moving Objects from a Moving Platform in Presence of Strong Parallax", International Conference on Computer Vision (ICCV'05) vol. 1, 2018, NCBI, https://www.researchgate.net/publication/4193783_Detection_and_tracking_of_moving_objects_from_a_moving_platform_in_presence_of_strong_parallax/link/56f58cad08ae81582bf214f2/download.

Wang, Zhongli et al., "A 3D Relative-Motion Context Constraint-Based MAP Solution for Multiple-Object Tracking Problems", Sensors Signal Processing and Visual Computing, 2018, MDPI, https://www.researchgate.net/publication/326555039_A_3D_Relative-Motion_Context_Constraint-Based_MAP_Solution_for_Multiple-Object_Tracking_Problems/link/5b55d15545851507a7c1878f/download.

\* cited by examiner

METHOD AND SYSTEM FOR MULTI INSTANCE VISUAL TRACKING BASED ON OBSERVER MOTION MODELLING

PRIORITY CLAIM

This U.S patent application claims priority under 35 U.S.C. § 119 to Indian provisional application no. 201921043155, filed on Oct. 23, 2019. The entire contents of the aforementioned application are incorporated herein by reference.

TECHNICAL FIELD

The disclosure herein generally relates to the field of visual tracking of objects, and more particularly, to a method and system for multi instance visual tracking based on observer motion modelling.

BACKGROUND

In the field of computer vision, visual tracking is one of the core problems. It mainly pertains with motion analysis of various objects. From point of view of applications of motion analysis, the dynamical behavior of observed objects in an evolving scene provides critical information towards the interpretation of observed phenomenon behind the evolution of the scene. Such behavior could be a manifestation of the motion of the objects themselves or could be due to movement of an observer (camera) itself. The dynamic scene interpretation could lead to such as tracking of objects, retrieving dominant motion (target or observer), quantifying object deformations, detection of anomalous target behaviors and so on.

Several methods such as patch-based methods, filter based methods, pure vision based approaches and deep learning based approaches have been evolved for visual tracking of objects. All these methods have some major challenges in dealing with the error rate, accuracy of tracking the moving objects when considering the video of the moving object. Further all the existing tracking problems deal with tracking the motion of target object only.

SUMMARY

Embodiments of the present disclosure present technological improvements as solutions to one or more of the above-mentioned technical problems recognized by the inventors in conventional systems. For example, in one embodiment, a method for multi instance visual tracking based on observer motion modelling is provided.

In an aspect, there is provided a processor implemented method for multi instance visual tracking based on observer motion modelling. The method comprises providing, via one or more hardware processors, a video captured by a color camera; extracting, a plurality of image frames from the video wherein the plurality of image frames comprises one or more objects of interest for tracking which are moving in the video; detecting, one or more bounding boxes associated with the one or more objects of interest in (i) a first image frame and (ii) a second image frame of the plurality of image frames; computing, a first stereo correspondence associated with the one or more bounding boxes between the first image frame and the second image frame wherein the first stereo correspondence represents a mapping between one or more points ($x_k$, k=1, 2, ..., n) associated with the corners of one or more bounding boxes n of the first image frame and one or more points ($x'_k$, k=1, 2, ..., n) associated with the corners of one or more bounding boxes n of the second image frame; computing, a first camera projection matrix (P') corresponding to the second image frame using the first stereo correspondence; iteratively performing for tracking the one or more objects of interest in a set of at least three image frames taken sequentially in each iteration from the plurality of image frames utilizing the one or more bounding boxes, the first stereo correspondence and the first camera projection matrix (P') in a first iteration and updating in a current iteration the first stereo correspondence and the first camera projection matrix by retrieving a second stereo correspondence and a second camera projection matrix computed in a previous iteration, the tracking comprising: detecting one or more bounding boxes associated with the one or more objects of interest in a third image frame of the set of at least three image frames; computing a second stereo correspondence associated with one or more matched keypoints between a second image frame of the set of at least three image frames and the third image frame of the set of at least three image frames; computing a second camera projection matrix (P'') corresponding to the third image frame of the set of three image frames using the second stereo correspondence; computing (i) a first epipole point (e') of the second image frame of the set of at least three image frames using the first camera projection matrix (P') and (ii) a second epipole point (e'') of the third image frame of the set of at least three image frames using the second camera projection matrix (P''); computing trifocal tensors ($T_1$, $T_2$, $T_3$) using columns of the first camera projection matrix (P') and the second camera projection matrix (P''); computing fundamental matrix ($F_{21}$) using the first epipole point (e'), the second epipole point (e'') and the trifocal tensors ($T_1$, $T_2$, $T_3$); updating the first stereo correspondence based on the fundamental matrix ($F_{21}$) wherein the updated first stereo correspondence represents a mapping between updated one or more points ($\hat{x}_k$, k=1, 2, ..., n) associated with the corners of the one or more bounding boxes n of the first image frame and updated one or more points ($\hat{x}'_k$, k=1, 2, ..., n) associated with the corners of the one or more bounding boxes n of the second image frame; computing an epipolar line ($l'_e$) in the second image frame of the set of at least three image frames using the updated first stereo correspondence and the fundamental matrix ($F_{21}$); computing in the third image frame one or more corresponding points ($x''_k$) of the updated one or more points ($\hat{x}_k$) in the first image frame of the set of at least three image frames using the updated one or more points of the first image frame ($\hat{x}_k$), a reference line (l') and the trifocal tensors wherein the reference line is a line perpendicular to the epipolar line passing through the updated one or more points of the second image frame ($\hat{x}'_k$); and tracking the one or more objects of interest in the third image frame of the set of at least three image frames by associating the one or more points ($\hat{x}''_k$) to corners of the one or more bounding boxes associated with the one or more objects of interest in a third image frame.

In another aspect, there is provided a system for multi instance visual tracking based on observer motion modelling. The system comprises: memory storing instructions; one or more communication interfaces; and one or more hardware processors coupled to the memory via the one or more communication interfaces, wherein the one or more hardware processors are configured by the instructions to provide a video captured by a color camera; extract, a plurality of image frames from the video wherein the plurality of image frames comprises one or more objects of interest for tracking which are moving in the video; detect one or more bounding boxes associated with the one or more objects of interest in (i) a first image frame and (ii) a second image frame of the plurality of image frames; compute a first stereo correspondence associated with the one or more bounding boxes between the first image frame and the second image frame wherein the first stereo correspondence represents a mapping between one or more points ($x_k$, k=1, 2, . . . , n) associated with the corners of one or more bounding boxes n of the first image frame and one or more points ($x'_k$, k=1, 2, . . . , n) associated with the corners of one or more bounding boxes n of the second image frame; computing, a first camera projection matrix (P') corresponding to the second image frame using the first stereo correspondence; iteratively performing for tracking the one or more objects of interest in a set of at least three image frames taken sequentially in each iteration from the plurality of image frames utilizing the one or more bounding boxes, the first stereo correspondence and the first camera projection matrix (P') in a first iteration and updating in a current iteration the first stereo correspondence and the first camera projection matrix by retrieving a second stereo correspondence and a second camera projection matrix computed in a previous iteration, the tracking comprising: detecting one or more bounding boxes associated with the one or more objects of interest in a third image frame of the set of at least three image frames; computing a second stereo correspondence associated with one or more matched keypoints between a second image frame of the set of at least three image frames and the third image frame of the set of at least three image frames; computing a second camera projection matrix (P'') corresponding to the third image frame of the set of at least three image frames using the second stereo correspondence; computing (i) a first epipole point (e') of the second image frame of the set of at least three image frames using the first camera projection matrix (P') and (ii) a second epipole point (e'') of the third image frame of the set of at least three image frames using the second camera projection matrix (P''); computing trifocal tensors ($T_1$, $T_2$, $T_3$) using columns of the first camera projection matrix (P') and the second camera projection matrix (P''); computing fundamental matrix ($F_{21}$) using the first epipole point (e'), the second epipole point (e'') and the trifocal tensors ($T_1$, $T_2$, $T_3$); updating the first stereo correspondence based on the fundamental matrix ($F_{21}$) wherein the updated first stereo correspondence represents a mapping between updated one or more points ($\hat{x}_k$, k=1, 2 . . . , n) associated with the corners of the one or more bounding boxes n of the first image frame and updated one or more points ($\hat{x}'_k$, k=1, 2 . . . , n) associated with the corners of the one or more bounding boxes n of the second image frame; computing an epipolar line ($l'_e$) in the second image frame of the set of at least three image frames using the updated first stereo correspondence and the fundamental matrix ($F_{21}$); computing in the third image frame one or more corresponding points ($\hat{x}''_k$) of the updated one or more points ($\hat{x}_k$) in the first image frame of the set of at least three image frames using the updated one or more points of the first image frame ($\hat{x}_k$), a reference line (l') and the trifocal tensors, wherein the reference line is a line perpendicular to the epipolar line passing through the updated one or more points of the second image frame ($\hat{x}'_k$); and tracking the one or more objects of interest in the third image frame of the set of at least three image frames by associating the one or more points ($\hat{x}''_k$) to corners of the one or more bounding boxes associated with the one or more objects of interest in a third image frame.

In an embodiment, the second stereo correspondence represents a mapping between one or more keypoints of the second image frame of the set of at least three image frames ($y'_k$, k=1, 2, . . . , n) matched to one or more keypoints of the third image frame of the set of at least three image frames ($y''_k$, k=1, 2, . . . , n).

In an embodiment, computing the fundamental matrix $F_{21}$ is represented as, $F_{21}=[e']_X[T_1, T_2, T_3]e''$ where x is a cross-product operator.

In yet another aspect, there are provided one or more non-transitory machine readable information storage mediums comprising one or more instructions which when executed by one or more hardware processors causes at least one of: providing, a video captured by a color camera; extracting a plurality of image frames from the video wherein the plurality of image frames comprises one or more objects of interest for tracking which are moving in the video; detecting, one or more bounding boxes associated with the one or more objects of interest in (i) a first image frame and (ii) a second image frame of the plurality of image frames; computing, a first stereo correspondence associated with the corners of one or more bounding boxes between the first image frame and the second image frame wherein the first stereo correspondence represents a mapping between one or more points ($x_k$, k=1, 2, . . . , n) associated with the corners of one or more bounding boxes n of the first image frame and one or more points ($x'_k$, k=1, 2 . . . , n) associated with the one or more bounding boxes n of the second image frame; computing, a first camera projection matrix (P') corresponding to the second image frame using the first stereo correspondence; iteratively performing for tracking the one or more objects of interest in a set of at least three image frames taken sequentially in each iteration from the plurality of image frames utilizing the one or more bounding boxes, the first stereo correspondence and the first camera projection matrix (P') in a first iteration and updating in a current iteration the first stereo correspondence and the first camera projection matrix by retrieving a second stereo correspondence and a second camera projection matrix computed in a previous iteration, the tracking comprising: detecting one or more bounding boxes associated with the one or more objects of interest in a third image frame of the set of at least three image frames; computing a second stereo correspondence associated with one or more matched keypoints between a second image frame of the set of at least three image frames and the third image frame of the set of at least three image frames; computing a second camera projection matrix (P'') corresponding to the third image frame of the set of at least three image frames using the second stereo correspondence; computing (i) a first epipole point (e') of the second image frame of the set of at least three image frames using the first camera projection matrix (P') and (ii) a second epipole point (e'') of the third image frame of the set of at least three image frames using the second camera projection matrix (P''); computing trifocal tensors ($T_1$, $T_2$, $T_3$) using columns of the first camera projection matrix (P') and the second camera projection matrix (P''); computing fundamental matrix ($F_{21}$) using the first epipole point (e'), the second epipole point (e'') and the trifocal tensors ($T_1$, $T_2$, $T_3$); updating the first stereo correspondence based on the fundamental matrix ($F_{21}$) wherein the updated first stereo correspondence represents a mapping between updated one or more points ($\hat{x}_k$, k=1, 2, . . . , n) associated with the corners of the one or more bounding boxes n of the first image frame and updated one or more points ($\hat{x}'_k$, k=1, 2 . . . , n) associated with the corners of the one or more bounding boxes n of the second image frame;

computing an epipolar line ($l'_e$) in the second image frame of the set of at least three image frames using the updated first stereo correspondence and the fundamental matrix ($F_{21}$); computing in the third image frame one or more corresponding points ($\hat{x}''_k$) of the updated one or more points ($\hat{x}_k$) in the first image frame of the set of at least three image frames using the updated one or more points of the first image frame ($\hat{x}_k$), a reference line ($l'$) and the trifocal tensors, wherein the reference line is a line perpendicular to the epipolar line passing through the updated one or more points of the second image frame ($\hat{x}'_k$); and tracking the one or more objects of interest in the third image frame of the set of at least three image frames by associating the one or more points ($\hat{x}''_k$) to corners of the one or more bounding boxes associated with the one or more objects of interest in a third image frame.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
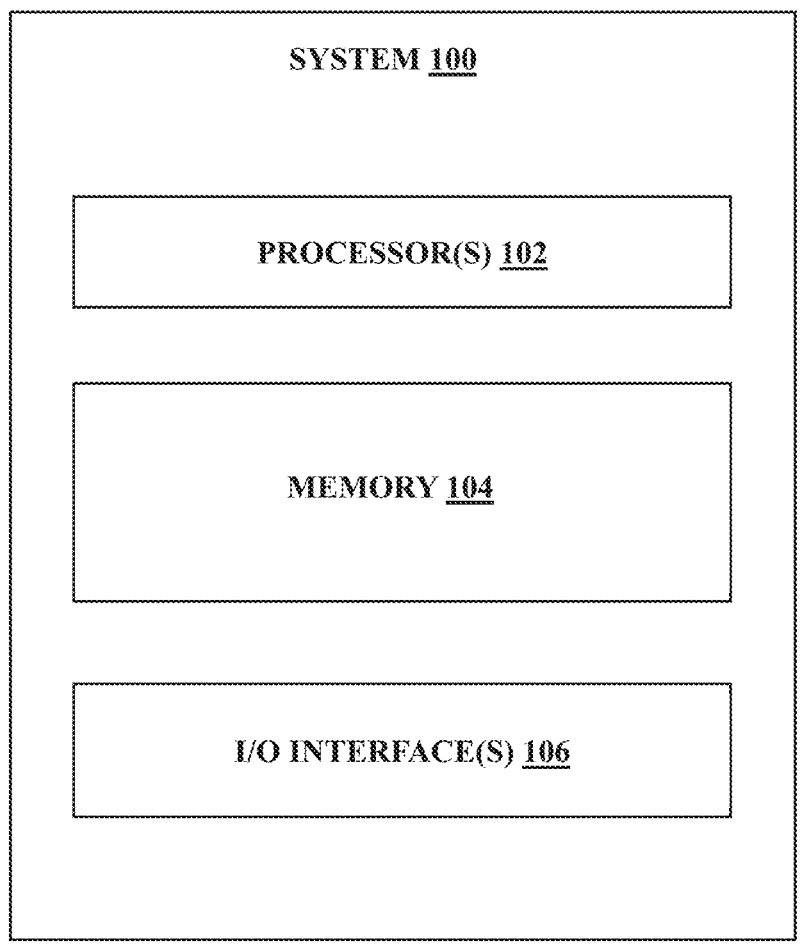
FIG. 1 illustrates an exemplary block diagram of a system for multi instance visual tracking based on observer motion modelling, according to some embodiments of the present disclosure.
Figure 2A:
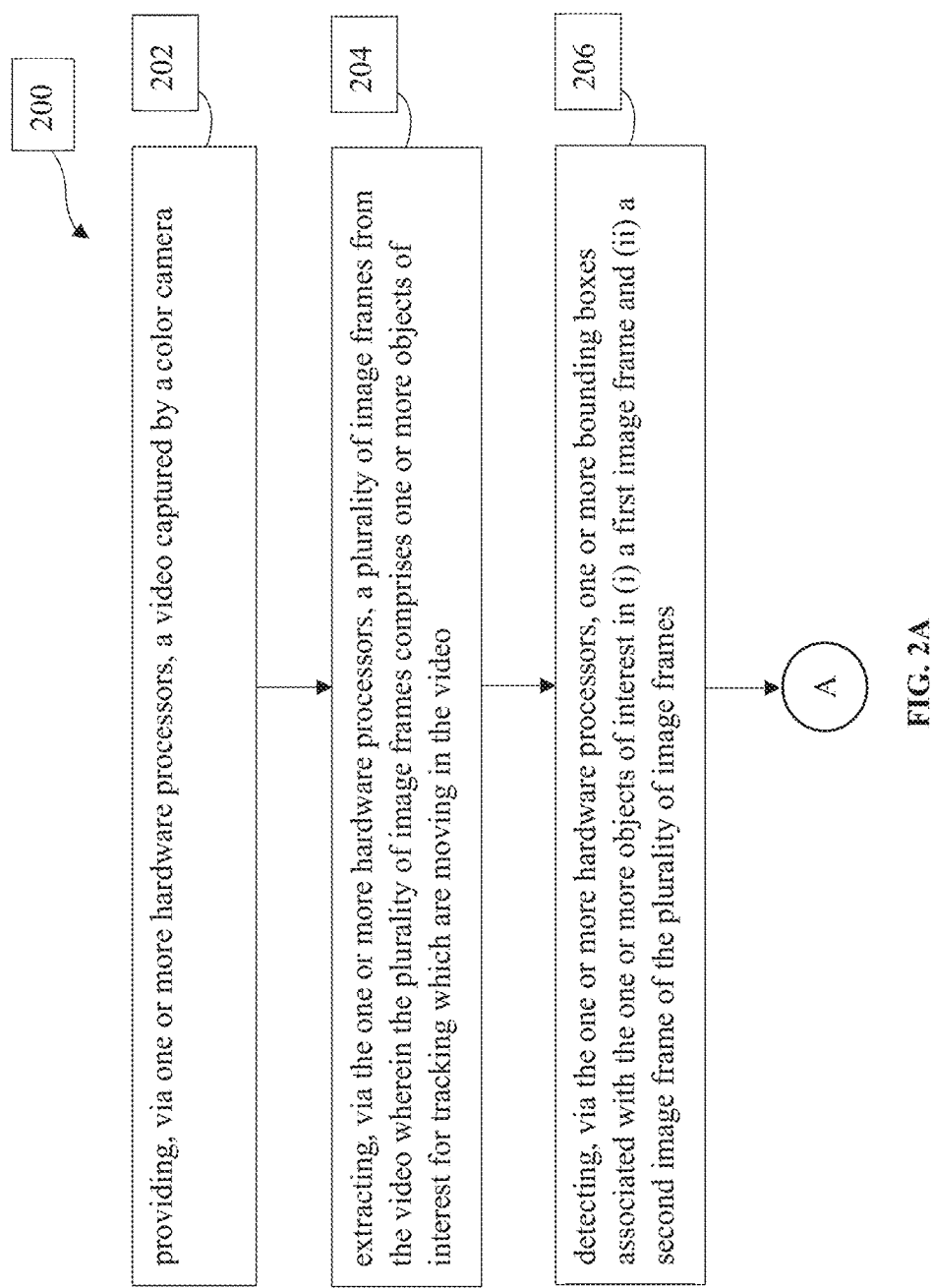
FIG. 2A through FIG. 2E is an exemplary flow diagram illustrating a method for multi instance visual tracking based on observer motion modelling according to some embodiments of the present disclosure.
Figure 2B:
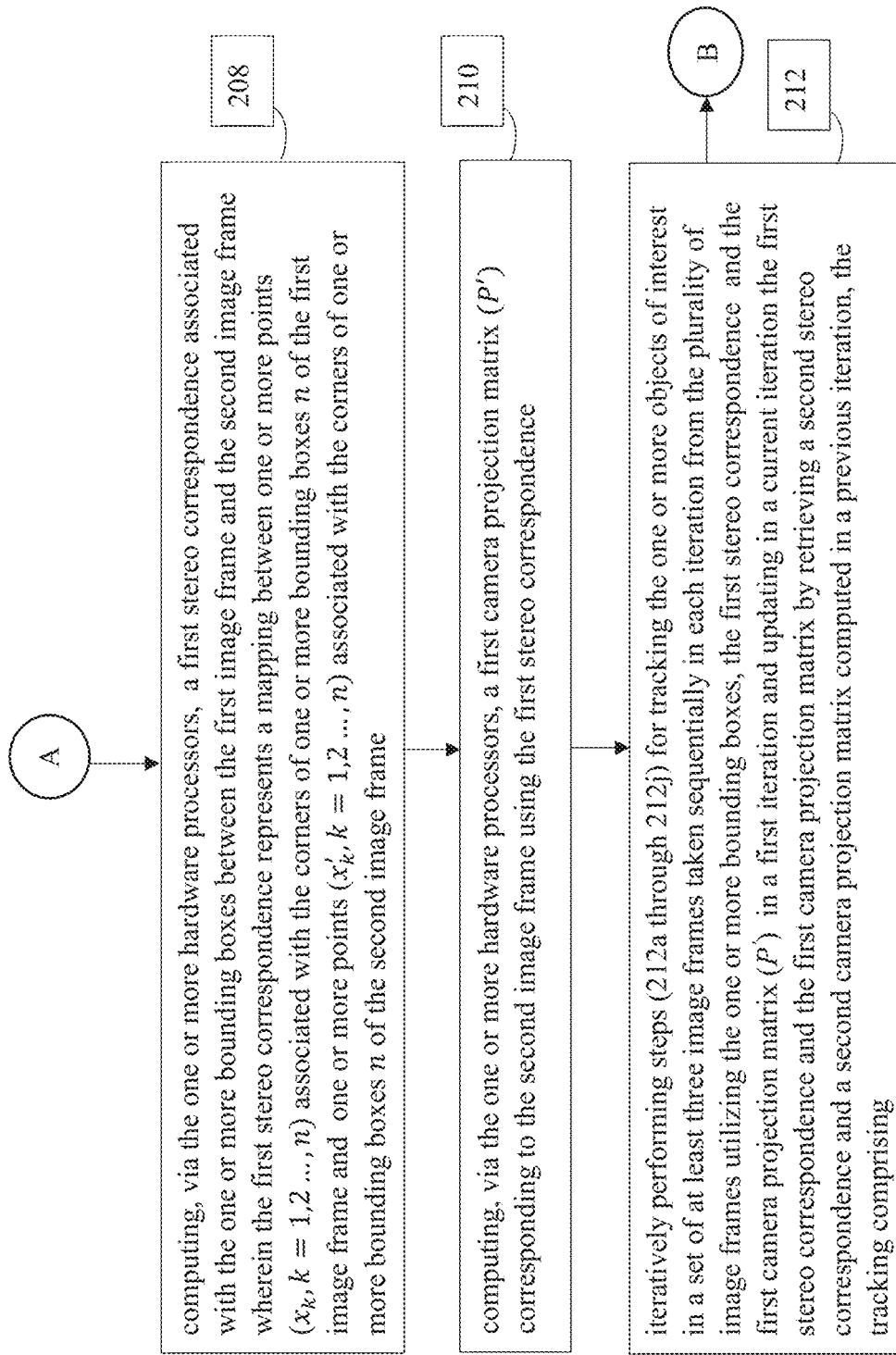
Figure 2C:
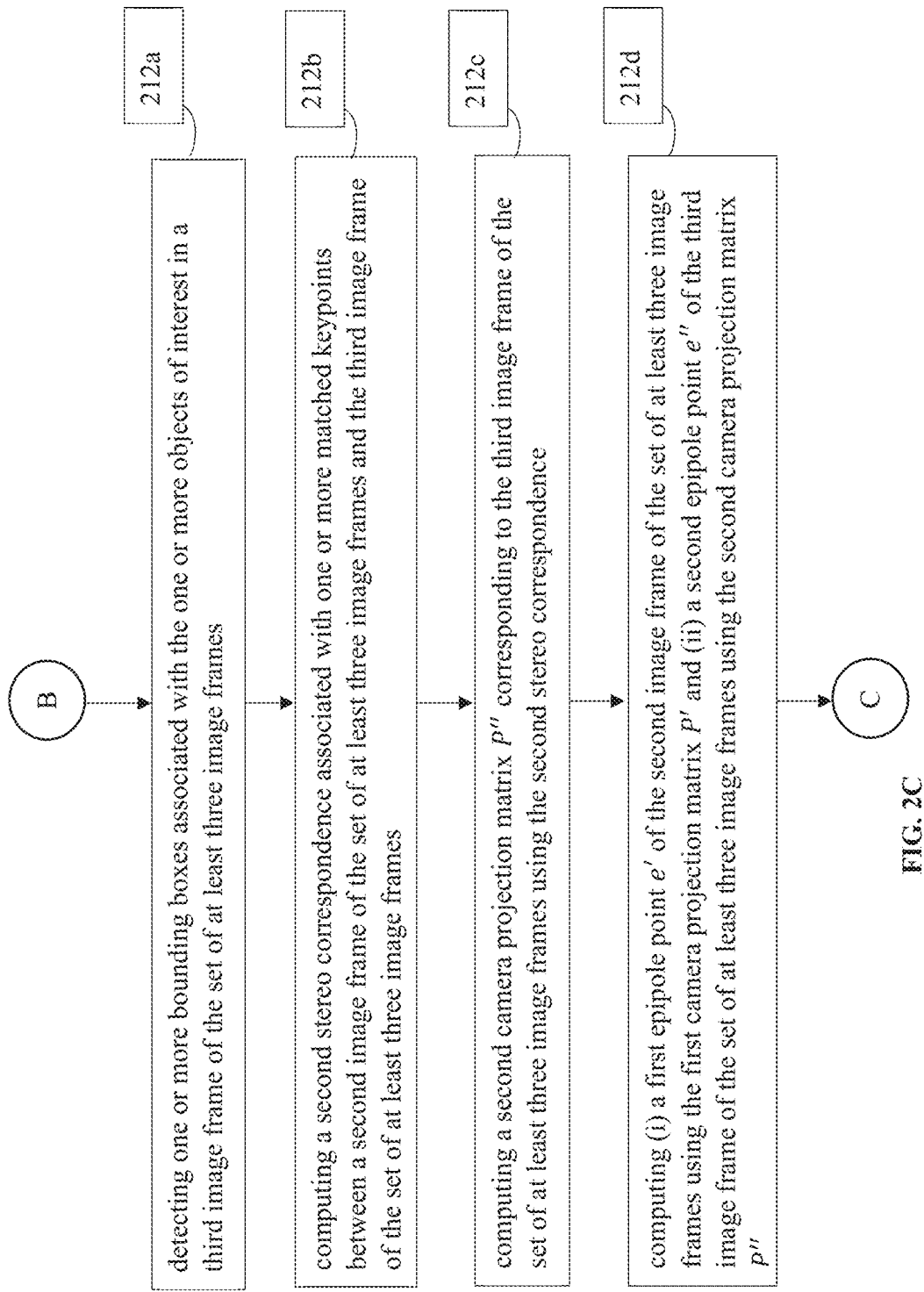
Figure 2D:
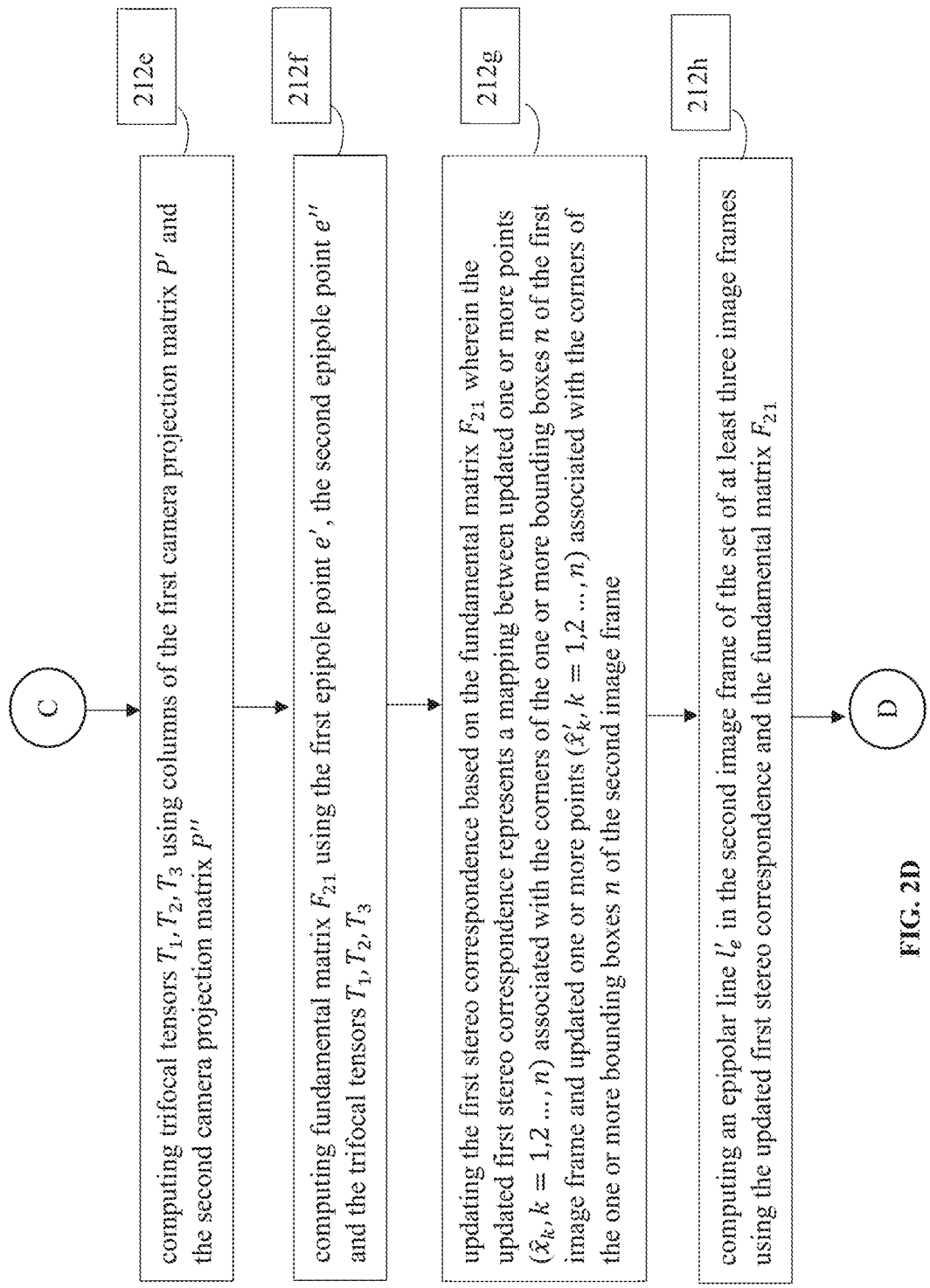
Figure 2E:
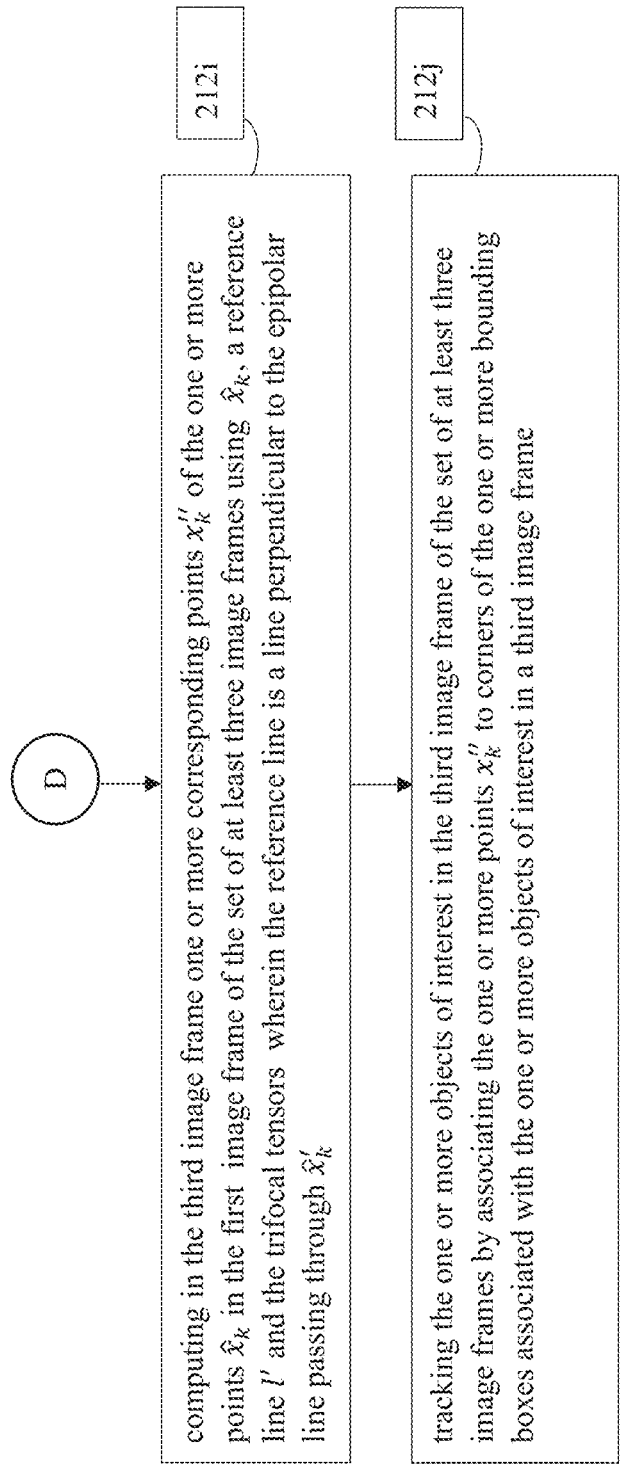

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Visual tracking is one of the longstanding core problems in the domain of computer vision. It mainly pertains with motion analysis of various objects in a dynamic scene. Tracking is the analysis of video sequences for the purpose of establishing the location of the target over a sequence of frames (time) starting from the bounding box given in the first frame. The visual tracking problem encompasses many a challenge. Illumination invariance, coping with change in appearance especially due to shadow and camera viewpoint changes, identical repeated instances of same object class are some object-centric challenges. Discontinuities in motion e.g. jittery motion, bouncy motion, articulated motion (break dance!), large displacements are some of the motion-centric challenges. Some of the motion-centric challenges also result in exit and entry of a target (generally, person) into an evolving scene, which demands object re-identification. Another complexity arises when there are multiple objects of interest to be tracked, in which case their motion trajectories can merge or split, and also sometimes they have very similar template in form of appearance and shape (clutch pencil vs. ball pen).

The evolution of visual tracking area is mainly divided into four epochs. In the first epoch, tracking in neighborhood using patch based methods such as Lucas-Kanadeand, Horn-Schunck tracking were prevalent. Such methods did not address most of the tracking challenges listed above. To address some of those challenges, especially of long-term tracking, methods from control theory was incorporated in computer vision, mainly the filter-based methods. They were further evolved to handle certain invariances, by describing an object via invariant key point descriptors, and incorporating location of such key points into the state vector representing the object motion. Many variants of these methods dominated the scene in the second epoch, including extension to multi-object tracking such as those using mixture models. One problem with filter-based methods was drift error in the estimate of the object state, which led to development of sensor-fusion based approaches. On the other side, pure vision approaches to deal with this problem led to a paradigm initially called Tracking-detection, which later on evolved into Tracking-learning-detection (TLD), in the third epoch. Of late, with the advent of Deep Learning, which manifests itself in end-to-end learning, much of TLD computation has fused into a single neural network, and also bypass the tracking performance of earlier works by an order of magnitude, due to sheer use of deep networks. In fact, the detection itself has become so robust that the need to track the motion robustly has started diluting. For long-term tracking, across hundreds of frames in a video tracking-learning-detection paradigm is used.

Few concepts on multi-view geometry are explained below:

The pinhole camera model describes the mathematical relationship between the coordinates of a point in three-dimensional space (physical world) and its projection onto an image plane of an ideal pinhole camera, where the camera aperture is described as a point and no lenses are used to focus light. The model does not include, for example, geometric distortions or blurring of unfocused objects caused by lenses and finite sized apertures.

Camera projection matrix: Camera matrix (Camera Projection matrix) is a 3×4 matrix that describes the mapping from the points in three-dimensional space to the two-dimensional points in an image. If $\bar{X}=(X, Y, Z, 1)$ and $\bar{x}=(x, y, 1)$ are the coordinates of the physical world and the image plane respectively, then the mapping between them can be represented as follows:

$$x = P \cdot X \qquad (1)$$

where P is the camera projection matrix.

Epipolar Geometry: The epipolar geometry is the intrinsic projective geometry between two views. It is independent of scene structure, and only depends on the cameras' internal parameters and relative pose. This geometry is usually motivated by considering the search for corresponding points in stereo matching. Suppose a point X in three-dimensional space is imaged in two views, at x in the first and x' in the second view. The rays back-projected from x and x' intersect at X, and the rays are coplanar, lying in same plane called epipolar plane.

Epipolar line: An epipolar line is the intersection of an epipolar plane with the image plane. All epipolar lines intersect at the epipole. An epipolar plane intersects the left and right image planes in epipolar lines and defines the correspondence between the lines. The epipole is the point of intersection of the line joining the camera centers (the baseline) with the image plane. Equivalently, the epipole is the image in one view of the camera centre of the other view. It is also the vanishing point of the baseline (translation) direction.

Fundamental Matrix: The fundamental matrix F encapsulates this intrinsic geometry. It is a 3×3 matrix of rank 2. If a point in three-dimensional space X is imaged as x in the first view, and x' in the second, then the image points satisfy the relation, $$x'^T \cdot F \cdot x = 0 \qquad (2)$$

Fundamental matrix maps the point x to the epipolar line l' which passes through the point x', and the mapping is represented as follows:

$$l' = F \cdot x \qquad (3)$$

There are many applications in which long-term tracking is required, spanning few hours of video, and hundreds of image frames. In such long sequence, different objects have their own life-cycles, during the relative motion between the observer (camera) and the observed (scene). Hence mere tracking of one or more objects assuming that they appear in the initial image frames, or short sequences, does not suffice. It is quite important that the entry of any object into a scene, at arbitrary point (image frame number), be facilitated via a detection sub-loop.

In many visual remote surveillance applications, the observer happens to be a moving observer. Hence the observing device, including camera, is most of the times, having its own motion. Such motion is hereafter referred as observer motion. In Stereo Vision community, this kind of motion is also known as ego-motion. Ego-motion is quite common in robotics, especially visual odometry problem, since most moving robots having camera fixed on them have non-trivial camera motion itself. However, in more precise terms, ego-motion refers to estimating a camera's 3D motion relative to a rigid scene. Here, the disclosed method describes a tracking purely in 2D sense, without any need to estimate 3D variables (structure or motion or both). This is to ensure fast tracking, without having to resort to more accurate but computationally complex 3D tracking. Hence the disclosed method tries to compensate for pixel movement in 2D, which indirectly incorporates ego-motion itself, not the estimated (3D) ego-motion.

In conventional tracking methods for single object tracking only the target motion is modeled. Let $z_t$ and $z_{t-1}$ denote the target coordinates in image frame at time t and (t−1), respectively. The classical tracking based on target motion model, small displacement assumption is simply expressed as:

$$z_t = z_{t-1} + \Delta z_t \qquad (4)$$

However, in cases such as drone tracking, modeling $\Delta z_t$ alone is inadequate. Hence there is a need for new motion model as a combination of the camera projection and the target motion being represented as:

$$z_t = H_t \cdot z_{t-1} + \Delta z_t \qquad (5)$$

where $H_t$ denotes the camera motion and $\Delta z_t$ is the location displacement due to motion of the target.

The method of single object tracking transfers any point in one image frame to another point in next image frame, using planar homography. This method transfers the corner points of one detection bounding box in image frame at time t to the image frame at time t−1. Using the planar homography, multiple objects can be tracked, and the multiple instance tracking problem is recasted into traditional data association sub-problem within tracking-detection paradigm of long-term tracking. There can be scenes in which there are multiple instances of same object. Their 2D projections may be very similar. On the other hand, they may differ due to change in the pose of individual instances themselves. For example, one instance of same class, present in the scene, is rotated around its own axis, while the other is not. Also, their scales may differ, if the instances exist on varying depths. Given all this uncertainty (being very similar or being very different), it is important to track them in a global sense.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary block diagram of a system for multi instance visual tracking based on observer motion modelling, according to some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system for performing multi instance visual tracking based on observer motion modelling may be stored in the memory 102.

FIG. 2A through FIG. 2E is an exemplary flow diagram illustrating a method for multi instance visual tracking based on observer motion modelling according to some embodiments of the present disclosure. In an embodiment, the system 100 comprises one or more data storage devices or the memory 104 operatively coupled to the one or more hardware processors 102 and is configured to store instructions for execution of steps of the method by the one or more processors 102. The steps of the method 200 of the present disclosure will now be explained with reference to components of the system 100 of FIG. 1.

In an embodiment of the present disclosure, the one or more processors 102 are configured to provide, at step 202, a video captured by a color camera. In an embodiment, the disclosed method uses the video captured by any type of color camera, such as point-and-shoot, DSLR, action cameras etc.

In an embodiment of the present disclosure, the one or more processors 102 are configured to extract, at step 204, a plurality of image frames from the video wherein the plurality of image frames comprises one or more objects of interest for tracking which are moving in the video. A scene is captured as a sequence of image frames comprising one or more objects of interest to be tracked. The one or more objects of interests in the plurality of image frames are moving as well.

In an embodiment of the present disclosure, the one or more processors 102 are configured to detect, at step 206, one or more bounding boxes associated with the one or more objects of interest in (i) a first image frame and (ii) a second image frame of the plurality of image frames. The one or more bounding boxes of the first image frame and the second image frame of the plurality of image frames are detected initially in the disclosed method. The one or more bounding boxes are detected using standard object detection methods such as Region based convolutional neural networks (RCNN), Yolo etc.

The present disclosed method for multi instance visual tracking is explained through basic concept of point transfer, involving the three sequential image frames from an observer (camera). A line $l'$ in the second image frame back-projects to a plane $\pi'$ in real-life 3D-space. A point x in the first image frame defines a ray in 3D-space which intersects $\pi'$ in a point X in the 3D space. The point X is then imaged as a point x" in the third image frame. Thus, any line $l'$ induces a homography between the first and the third image frames, defined by its back-projected plane $\pi'$. Points C, C' and C" are 3D positions of camera center of the three image frames, observing the point X from different locations.

Suppose the point X in 3D-space is imaged in two video frames, at x in the first image frame, and x' in the second image frame. The points x and x', the 3D space point X, and the camera centers are coplanar. Let this plane be denoted as $\pi$. Clearly, rays back-projected from x and x' intersect at X, and the rays are coplanar, lying in $\pi$. Suppose if only x is known, x' is unknown and to be determined. The plane $\pi$ is determined by the baseline and the ray defined by x. The baseline is a line that runs from camera center C of the first image frame, to the camera center C' in the second image frame. Thus, the ray corresponding to the (unknown) point x' lies in $\pi$, hence the point x' lies on the line of intersection $l'$ of $\pi$ with the second image frame plane. This line $l'$ is in the second image frame by the ray back-projected from x. It is an epipolar line corresponding to x. An epipole is a point of intersection of a line joining the camera centers (the baseline) with the image plane. Equivalently, the epipole is the image in one image frame of the camera center of the other image frame. Thus, mapping is a projective mapping from points to lines, which is represented by a matrix F, the fundamental matrix. This leads to the relation, $l'=F \cdot x$.

In an embodiment of the present disclosure, the one or more processors 102 are configured to compute, at step 208, a first stereo correspondence associated with the corners of one or more bounding boxes between the first image frame and the second image frame wherein the first stereo correspondence represents a mapping between one or more points $(x_k, k=1, 2, \ldots, n)$ associated with the one or more bounding boxes n of the first image frame and one or more points $(x'_k, k=1, 2, \ldots, n)$ associated with the corners of one or more bounding boxes n of the second image frame. The mapping can be represented as $x_k \leftrightarrow x'_k$. The first stereo correspondence is a mapping between the first image frame and the second image frame. The mapping is represented using the one or more corner points associated with the one or more bounding boxes of the first image frame and the one or more corner points associated with the one or more bounding boxes of the second image frame. The one or more points can be a specific corner of the bounding box, for example, top-left corner and bottom right corner (convention in computer vision), the centroid of the bounding box and so on.

In an embodiment of the present disclosure, the one or more processors 102 are configured to compute, at step 210, a first camera projection matrix P' corresponding to the second image frame using the first stereo correspondence. The first camera projection matrix corresponds to the second image frame and is computed using the maximum likelihood estimation (MLE) methods known in the prior art, using the first stereo correspondence.

In an embodiment of the present disclosure, the one or more processors 102 are configured to iteratively perform, at step 212, steps (212a through 212j) for tracking the one or more objects of interest in a set of at least three image frames taken sequentially in each iteration from the plurality of image frames utilizing the one or more bounding boxes, the first stereo correspondence and the first camera projection matrix (P') in a first iteration and updating in a current iteration the first stereo correspondence and the first camera projection matrix by retrieving a second stereo correspondence and a second camera projection matrix computed in a previous iteration. In an embodiment of the present disclosure, the tracking of one or more objects of interest is iteratively performed by taking at least three image frames from the plurality of image frames in each iteration. The tracking can be also performed by taking more than three image frames at a time sequentially and randomly from the plurality of image frames for processing. For example, a set of three sequential image frames are considered at a time t, wherein the three sequential image frames represents the frames at time (t−2) (the first image frame), (t−1) (second image frame) and t (third image frame) respectively. The set of three image frames may also be taken sequentially in a random manner. i.e., for example, a set of three sequential image frames are considered at time t, wherein the three sequential image frames represents the image frames at time (t−10) (the first image frame), (t−6) (the second image frame) and t (the third image frame) respectively. The tracking is stopped until a user driven constraint is provided, or if the end application has a constraint that it needs to track objects of interest for next one hour or if the objects of interest goes out of frame, the tracking will go on till that constraint is met.

In an embodiment of the present disclosure, the one or more processors 102 are configured to detect, at step 212a, one or more bounding boxes associated with the one or more objects of interest in a third image frame of the set of at least three image frames. The one or more bounding boxes are detected using the standard methods as described in step 206.

Figure 4:
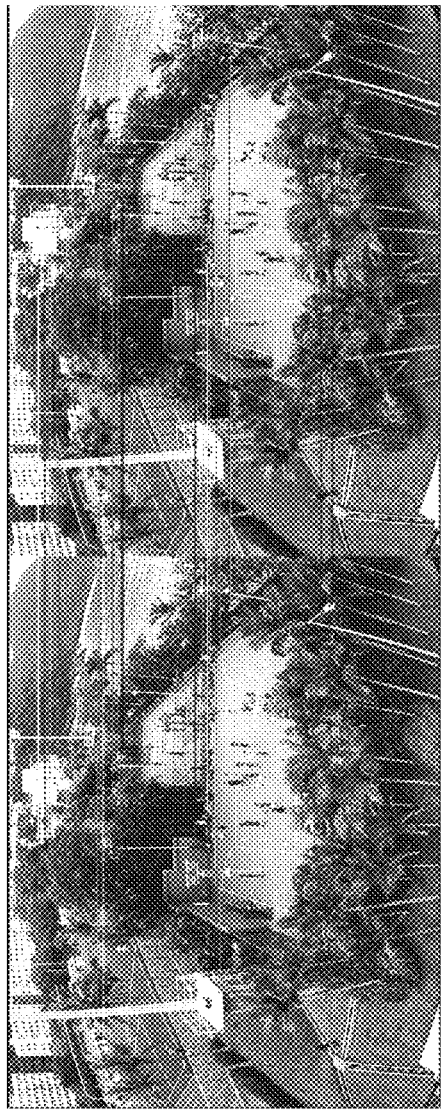
FIG. 4 illustrates experimental results of keypoint matching in two consecutive image frames of a video, according to embodiments of the present disclosure.

In an embodiment of the present disclosure, the one or more processors 102 are configured to compute, at step 212b, a second stereo correspondence associated with the one or more matched keypoints between a second image frame of the set of at least three image frames and the third image frame of the set of at least three image frames, keypoints being generated using known methods from prior art e.g. scale-invariant feature transform (SIFT), speeded up robust features (SURF), Oriented FAST and rotated BRIEF (ORB)-based keypoint detection. The second stereo correspondence represents a mapping between the one or more keypoints of the second image frame of the set of at least three image frames ($y'_k$, k=1, 2 . . . , n) matched to one or more keypoints of the third image frame of the set of at least three image frames ($y''_k$, k=1, 2 . . . , n). The mapping of the second stereo correspondence can be represented as $y'_k \leftrightarrow y''_k$. The keypoint matching of two consecutive image frames using any of the prior methods aforementioned is shown in FIG. 4. FIG. 4 illustrates experimental results of keypoint matching in two consecutive image frames of a video, according to embodiments of the present disclosure.

In an embodiment of the present disclosure, the one or more processors 102 are configured to compute, at step 212c, a second camera projection matrix P''' corresponding to the third image frame of the set of at least three image frames using the second stereo correspondence. The second camera projection matrix is computed using the maximum likelihood estimation (MLE) methods known in the prior art, from the second stereo correspondence.

In an embodiment of the present disclosure, the one or more processors 102 are configured to compute, at step 212d, (i) a first epipole point e' of the second image frame of the set of at least three image frames using the first camera projection matrix P' and (ii) a second epipole point e''' of the third image frame of the set of at least three image frames using the second camera projection matrix P'''. Let the camera projection matrices for the first image frame be P=[I|0], as usual (I being identity matrix), the second image frame be P'=[A|$a_4$] and the third image frame be P'''=[B|$b_4$], where A and B are 3×3 matrices, and the vectors $a_i$ and $b_i$ are the $i^{th}$ columns of the respective camera projection matrices for i=1, . . . , 4. $a_4$ and $b_4$ are the first epipole point in the second image frame and the second epipole point in the third image frame respectively, arising from the first camera projection matrix and the second camera projection matrix. These epipole points are denoted by e' and e'''.

In an embodiment of the present disclosure, the one or more processors 102 are configured to compute, at step 212e, trifocal tensors $T_1$, $T_2$, $T_3$ using columns of the first camera projection matrix P' and the second camera projection matrix P'''. The trifocal tensors are calculated from the columns of the first camera projection matrix and the second camera projection matrix. The trifocal tensors $T_i$, for i=1, 2, 3 are represented as $$T_i = a_i b_4^T - a_4 b_i^T \quad (6)$$

In an embodiment of the present disclosure, the one or more processors 102 are configured to compute, at step 212f, fundamental matrix $F_{21}$ using the first epipole point e', the second epipole point e''' and the trifocal tensors $T_1$, $T_2$, $T_3$. The fundamental matrix $F_{21}$ satisfies the condition $x_k^T \cdot F_{21} \cdot x'_k = 0$ for the one or more points in the first image frame and the one or more points in the second image frame. The fundamental matrix is calculated as equation (7) below:

$$F_{21} = [e']_X [T_1, T_2, T_3] e''' \quad (7)$$

where X is defined as a cross product vector wherein if $(a_1, a_2, a_3)^T$ is a three dimensional—vector, then a corresponding skew-symmetric matrix can be defined which is used to define a cross-product operator, as follows $$[a]_X = \begin{bmatrix} 0 & -a_3 & a_2 \\ a_3 & 0 & -a_1 \\ -a_2 & a_1 & 0 \end{bmatrix}$$

In an embodiment of the present disclosure, the one or more processors 102 are configured to update, at step 212g, the first stereo correspondence based on the fundamental matrix $F_{21}$ wherein the updated first stereo correspondence represents a mapping between updated one or more points ($\hat{x}_k$, k=1, 2, . . . , n) associated with the corners of the one or more bounding boxes n of the first image frame and updated one or more points ($\hat{x}'_k$, k=1, 2, . . . , n) associated with the corners of the one or more bounding boxes n of the second image frame. The first stereo correspondence represented as $x_k \leftrightarrow x'_k$ is updated to an exact stereo correspondence and can be represented as $\hat{x}_k \leftrightarrow \hat{x}'_k$ using the fundamental matrix calculated using known algorithms from prior art, e.g. 8-point algorithm.

In an embodiment of the present disclosure, the one or more processors 102 are configured to compute, at step 212h, an epipolar line $l'_e$ in the second image frame of the set of at least three image frames using the updated first stereo correspondence and the fundamental matrix $F_{21}$. The embodiments of present disclosure utilize the concept of point transfer which has been explained earlier. Henceforth, to track the objects of interest in each frame, another reference line l', passing through $\hat{x}'_k$ and perpendicular to $l'_e$, in the second image frame is computed using the equation (8) shown:

$$l' = (l_2 - l_1, \hat{x}_1 l_2 + \hat{x}_2 l_1)^T \quad (8)$$

where $l'_e = F_{21} \hat{x}_k$, $l'_e = (l_1, l_2, l_3)^T$ and $\hat{x}'_k = (\hat{x}'_{k1}, \hat{x}'_{k2}, 1)^T$.

In an embodiment of the present disclosure, the one or more processors 102 are configured to compute, at step 212i, in the third image frame one or more corresponding points $x''_k$ of the one or more points $\hat{x}_k$ in the first image frame of the set of at least three image frames using the updated one or more points of the first image frame $\hat{x}_k$, the reference line l' and the trifocal tensors wherein the reference line is a line perpendicular to the epipolar line passing through the updated one or more points of the second image frame ($\hat{x}'_k$). The one or more points in the third image frame $x''_k$ is calculated by the concept of point transfer, and the one or more points transferred in the third image frame corresponding to the one or more points in the first image frame are computed using the equation (9) shown (where $T_k^{ij}$ is the $ij^{th}$ entry of the matrix corresponding to the trifocal tensor $T_k$):

$$x''_k = \hat{x}_i \cdot l'_j \cdot T_k^{ij} \quad (9)$$

where k=1, 2, 3.

In an embodiment of the present disclosure, the one or more processors 102 are configured to track at step 212j, the one or more objects of interest in the third image frame of the set of at least three image frames by associating the one or more points $x''_k$ to corners of the one or more bounding boxes associated with the one or more objects of interest in a third image frame. Each point $x''_k$ is associated to one of the corners of one or more bounding boxes of objects of interest detected in the third image frame by calculating distance between coordinates of the one or more points $x''_k$ and the coordinates of the one or more corners of the bounding boxes in the third image frame. For example L2 distance is calculated between coordinates of the one or more points $x''_k$ and coordinates of the one or more corners of the bounding boxes in the third image frame and further the points with less distance are associated to the corners of the bounding boxes where the bounding boxes are detected via repetition of step [031] herein, albeit applied on the third frame.

The steps from 212*a* to 212*j* is iteratively repeated for finding the one or more points in the third image frame of the set of at least three image frames taken sequentially at a time. Thus by computing the one or more points in every third image frame of the set of at least three image frames the present disclosure tracks the one or more objects of interest in the video captured.

Figure 3A:
FIG. 3A through FIG. 3B illustrates experimental results for multi instance visual tracking based on observer motion modelling, according to embodiments of the present disclosure.
Figure 3B:
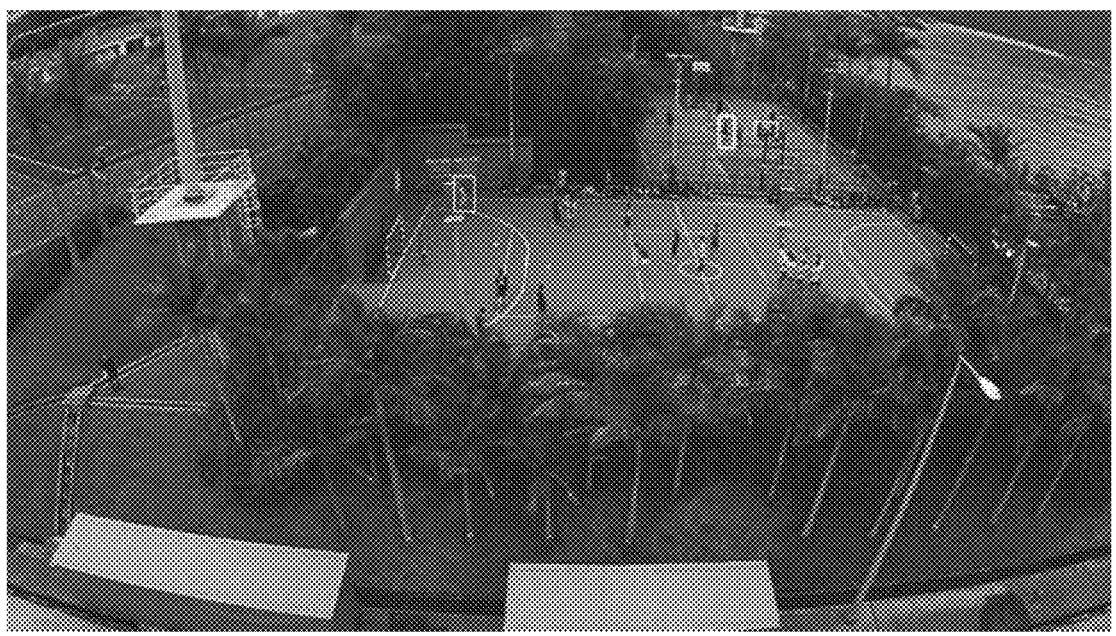

FIG. 3A and FIG. 3B illustrates experimental results for multi instance visual tracking based on observer motion modelling, according to embodiments of the present disclosure. FIG. 3A shows one image frame from the captured video with bounding boxes for two moving objects being tracked and FIG. 3B shows the same two moving objects tracked in a different image frame using the method 200 explained for multi instance visual tracking based on observer motion modelling. The moving objects are basketball players, while the camera mounted on a drone also moves simultaneously and hence the viewpoint changes drastically, leading to significant displacement of objects of interest with respect to a reference point e.g. top-left corner of the image frame. These image frames are part of the public DTB tracking dataset. ORB detector was used to generate keypoints in each image frame, and 40 keypoints each were used to match across two successive image frames and establish various fundamental matrices. For bounding box detection, native detection mechanism within the DSST tracking algorithm was used.

The embodiments of the present disclosure herein address the problem of multi instance tracking based on observer motion modelling. The method considers the observer motion along with the movement of objects to be tracked by using the trifocal tensor approach. The method when compared to patch based and filter based methods provides better accuracy and the computation costs are much less.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:

providing, via one or more hardware processors, a video captured by a color camera (202);

extracting, via the one or more hardware processors, a plurality of image frames from the video wherein the plurality of image frames comprises one or more objects of interest for tracking which are moving in the video (204);

detecting, via the one or more hardware processors, one or more bounding boxes associated with the one or more objects of interest in (i) a first image frame and (ii) a second image frame of the plurality of image frames (206);

computing, via the one or more hardware processors, a first stereo correspondence associated with the one or more bounding boxes between the first image frame and the second image frame wherein the first stereo correspondence represents a mapping between one or more points ($x_k$, k=1, 2 . . . , n) associated with the corners of one or more bounding boxes n of the first image frame and one or more points ($x'_k$, k=1, 2, . . . , n) associated with the corners of one or more bounding boxes n of the second image frame (208);

computing, via the one or more hardware processors, a first camera projection matrix (P') corresponding to the second image frame using the first stereo correspondence (210);

iteratively performing steps (212a through 212j) for tracking the one or more objects of interest in a set of at least three image frames taken sequentially in each iteration from the plurality of image frames utilizing the one or more bounding boxes, the first stereo correspondence and the first camera projection matrix (P') in a first iteration and updating in a current iteration the first stereo correspondence and the first camera projection matrix by retrieving a second stereo correspondence and a second camera projection matrix computed in a previous iteration, the tracking comprising (212):

detecting one or more bounding boxes associated with the one or more objects of interest in a third image frame of the set of at least three image frames (212a);

computing a second stereo correspondence associated with one or more matched keypoints between a second image frame of the set of at least three image frames and the third image frame of the set of at least three image frames (212b);

computing a second camera projection matrix (P") corresponding to the third image frame of the set of at least three image frames using the second stereo correspondence (212c);

computing (i) a first epipole point (e') of the second image frame of the set of at least three image frames using the first camera projection matrix (P') and (ii) a second epipole point (e") of the third image frame of the set of at least three image frames using the second camera projection matrix (P") (212d);

computing trifocal tensors ($T_1$, $T_2$, $T_3$) using columns of the first camera projection matrix (P') and the second camera projection matrix (P") (212e);

computing fundamental matrix ($F_{21}$) using the first epipole point (e'), the second epipole point (e") and the trifocal tensors ($T_1$, $T_2$, $T_3$) (212f);

updating the first stereo correspondence based on the fundamental matrix ($F_{21}$) wherein the updated first stereo correspondence represents a mapping between updated one or more points ($\hat{x}_k$, k=1, 2, . . . , n) associated with the corners of the one or more bounding boxes n of the first image frame and updated one or more points ($\hat{x}'_k$, k=1, 2, . . . , n) associated with the corners of the one or more bounding boxes n of the second image frame (212g);

computing an epipolar line ($l'_e$) in the second image frame of the set of at least three image frames using the updated first stereo correspondence and the fundamental matrix ($F_{21}$)(212h);

computing in the third image frame one or more corresponding points $x''_k$ of the updated one or more points ($\hat{x}_k$) in the first image frame of the set of at least three image frames using the updated one or more points of the first image frame ($\hat{x}_k$), a reference line (l') and the trifocal tensors wherein the reference line is a line perpendicular to the epipolar line passing through the updated one or more points of the second image frame $\hat{x}'_k$ (212i); and tracking the one or more objects of interest in the third image frame of the set of at least three image frames by associating the one or more points ($\hat{x}''_k$) to corners of the one or more bounding boxes associated with the one or more objects of interest in a third image frame (212j).

2. The processor implemented method of claim 1, wherein the second stereo correspondence represents a mapping between one or more keypoints of the second image frame of the set of at least three image frames ($y'_k$, k=1, 2, . . . , n) matched to one or more keypoints of the third image frame of the set of at least three image frames ($y''_k$, k=1, 2 . . . , n).

3. The processor implemented method of claim 1, wherein computing the fundamental matrix $F_{21}$ is represented as, $F_{21}=[e']_x[T_1,T_2,T_3]e''$ where x is a cross-product operator.

4. A system (100), comprising:
a memory (104) storing instructions;
one or more communication interfaces (106); and
one or more hardware processors (102) coupled to the memory (104) via the one or more communication interfaces (106), wherein the one or more hardware processors (104) are configured by the instructions to:
provide a video captured by a color camera;
extract a plurality of image frames from the video wherein the plurality of image frames comprises one or more objects of interest for tracking which are moving in the video;
detect one or more bounding boxes associated with the one or more objects of interest in (i) a first image frame and (ii) a second image frame of the plurality of image frames;
compute a first stereo correspondence associated with the one or more bounding boxes between the first image frame and the second image frame wherein the first stereo correspondence represents a mapping between one or more points ($x_k$, k=1, 2, . . . , n) associated with the corners of one or more bounding boxes n of the first image frame and one or more points ($x'_k$, k=1, 2, . . . , n) associated with the corners of one or more bounding boxes n of the second image frame;
compute a first camera projection matrix (P') corresponding to the second image frame using the first stereo correspondence;
iteratively performing to track the one or more objects of interest in a set of at least three image frames taken sequentially in each iteration from the plurality of image frames utilizing the one or more bounding boxes, the first stereo correspondence and the first camera projection matrix (P') in a first iteration and updating in a current iteration the first stereo correspondence and the first camera projection matrix by retrieving a second stereo correspondence and a second camera projection matrix computed in a previous iteration, the tracking comprising:
  detect one or more bounding boxes associated with the one or more objects of interest in a third image frame of the set of at least three image frames;
  compute a second stereo correspondence associated with one or more matched keypoints between a second image frame of the set of at least three image frames and the third image frame of the set of at least three image frames;
  compute a second camera projection matrix (P''') corresponding to the third image frame of the set of at least three image frames using the second stereo correspondence;
  compute (i) a first epipole point (e') of the second image frame of the set of at least three image frames using the first camera projection matrix (P') and (ii) a second epipole point (e'') of the third image frame of the set of at least three image frames using the second camera projection matrix (P''');
  compute trifocal tensors ($T_1$, $T_2$, $T_3$) using columns of the first camera projection matrix (P') and the second camera projection matrix (P''');
  compute fundamental matrix ($F_{21}$) using the first epipole point (e'), the second epipole point (e'') and the trifocal tensors ($T_1$, $T_2$, $T_3$);
  update the first stereo correspondence based on the fundamental matrix ($F_{21}$) wherein the updated first stereo correspondence represents a mapping between updated one or more points ($\hat{x}_k$, k=1, 2, . . . , n) associated with the corners of the one or more bounding boxes n of the first image frame and updated one or more points ($\hat{x}'_k$, k=1, 2, . . . , n) associated with the corners of the one or more bounding boxes n of the second image frame;
  compute an epipolar line ($l'_e$) in the second image frame of the set of at least three image frames using the updated first stereo correspondence and the fundamental matrix ($F_{21}$);
  compute in the third image frame one or more corresponding points $x''_k$ of the updated one or more points ($\hat{x}_k$) in the first image frame of the set of at least three image frames using ($\hat{x}_k$), a reference line (l') and the trifocal tensors wherein the reference line is a line perpendicular to the epipolar line passing through the updated one or more points of the second image frame $\hat{x}'_k$; and
  track the one or more objects of interest in the third image frame of the set of at least three image frames by associating the one or more points ($x''_k$) to corners of the one or more bounding boxes associated with the one or more objects of interest in a third image frame.

5. The system of claim 4, wherein the second stereo correspondence represents a mapping between one or more keypoints of the second image frame of the set of at least three image frames ($y'_k$, k=1, 2 . . . , n) matched to one or more keypoints of the third image frame of the set of at least three image frames ($y''_k$, k=1, 2 . . . , n).

6. The system of claim 4, wherein computing the fundamental matrix $F_{21}$ is represented as, $$F_{21}=[e']_x[T_1,T_2,T_3]e''$$

where x is a cross-product operator.

7. One or more non-transitory machine readable information storage mediums comprising one or more instructions, which when executed by one or more hardware processors causes a method for:
  providing a video captured by a color camera;
  extracting a plurality of image frames from the video wherein the plurality of image frames comprises one or more objects of interest for tracking which are moving in the video;
  detecting one or more bounding boxes associated with the one or more objects of interest in (i) a first image frame and (ii) a second image frame of the plurality of image frames;
  computing a first stereo correspondence associated with the one or more bounding boxes between the first image frame and the second image frame wherein the first stereo correspondence represents a mapping between one or more points ($x_k$, k=1, 2, . . . , n) associated with the corners of one or more bounding boxes n of the first image frame and one or more points ($x'_k$, k=1, 2, . . . , n) associated with the corners of one or more bounding boxes n of the second image frame;
  computing a first camera projection matrix (P') corresponding to the second image frame using the first stereo correspondence;
  iteratively performing for tracking the one or more objects of interest in a set of at least three image frames taken sequentially in each iteration from the plurality of image frames utilizing the one or more bounding boxes, the first stereo correspondence and the first camera projection matrix (P') in a first iteration and updating in a current iteration the first stereo correspondence and the first camera projection matrix by retrieving a second stereo correspondence and a second camera projection matrix computed in a previous iteration, the tracking comprising:
    detecting one or more bounding boxes associated with the one or more objects of interest in a third image frame of the set of at least three image frames;
    computing a second stereo correspondence associated with one or more matched keypoints between a second image frame of the set of at least three image frames and the third image frame of the set of at least three image frames;
    computing a second camera projection matrix (P''') corresponding to the third image frame of the set of at least three image frames using the second stereo correspondence;
    computing (i) a first epipole point (e') of the second image frame of the set of at least three image frames using the first camera projection matrix (P') and (ii) a second epipole point (e'') of the third image frame of the set of at least three image frames using the second camera projection matrix (P''');
    computing trifocal tensors ($T_1$, $T_2$, $T_3$) using columns of the first camera projection matrix (P') and the second camera projection matrix (P''');
    computing fundamental matrix ($F_{21}$) using the first epipole point (e'), the second epipole point (e'') and the trifocal tensors ($T_1$, $T_2$, $T_3$);
    updating the first stereo correspondence based on the fundamental matrix ($F_{21}$) wherein the updated first stereo correspondence represents a mapping between updated one or more points ($\hat{x}_k$, k=1, 2 . . . , n) associated with the corners of the one or more bounding boxes n of the first image frame and updated one or more points ($\hat{x}'_k$, k=1, 2 . . . , n)

associated with the corners of the one or more bounding boxes n of the second image frame;

computing an epipolar line ($l'_e$) in the second image frame of the set of at least three image frames using the updated first stereo correspondence and the fundamental matrix ($F_{21}$);

computing in the third image frame one or more corresponding points $x''_k$ of the updated one or more points ($\hat{x}_k$) in the first image frame of the set of at least three image frames using the updated one or more points of the first image frame ($\hat{x}_k$), a reference line ($l'$) and the trifocal tensors wherein the reference line is a line perpendicular to the epipolar line passing through the updated one or more points of the second image frame $\hat{x}'_k$; and tracking the one or more objects of interest in the third image frame of the set of at least three image frames by associating the one or more points ($\hat{x}''_k$) to corners of the one or more bounding boxes associated with the one or more objects of interest in a third image frame.

8. The one or more non-transitory machine readable information storage mediums of claim 7, wherein the second stereo correspondence represents a mapping between one or more keypoints of the second image frame of the set of at least three image frames ($y'_k$, k=1, 2, . . . , n) matched to one or more keypoints of the third image frame of the set of at least three image frames ($y''_k$, k=1, 2, . . . , n).

9. The one or more non-transitory machine readable information storage mediums of claim 7, wherein computing the fundamental matrix $F_{21}$ is represented as, $$F_{21}=[e']_x[T_1,T_2,T_3]e''$$

where x is a cross-product operator.

* * * * *